United States Patent [19]

Takatori

[11] Patent Number: 5,633,581

[45] Date of Patent: May 27, 1997

[54] FOCUSING VOLTAGE ADJUSTING CIRCUIT AND FLYBACK TRANSFORMER INSTALLING THE SAME

[75] Inventor: Yukio Takatori, Kasukabe, Japan

[73] Assignee: Victor Company of Japan, Ltd., Yokohama, Japan

[21] Appl. No.: 392,167

[22] Filed: Feb. 22, 1995

[30] Foreign Application Priority Data

| Feb. 22, 1994 | [JP] | Japan | 6-047761 |
| Feb. 25, 1994 | [JP] | Japan | 6-053321 |
| Feb. 25, 1994 | [JP] | Japan | 6-053322 |
| Feb. 25, 1994 | [JP] | Japan | 6-053323 |

[51] Int. Cl.$^6$ ............... G05B 24/02; H04N 3/22; H04N 3/26; G09G 1/04
[52] U.S. Cl. ............... 323/354; 348/806; 315/382.1
[58] Field of Search ............... 323/297, 296, 323/353, 354; 313/412, 414; 315/382.1, 382; 348/745, 806

[56] References Cited

U.S. PATENT DOCUMENTS

| 4,198,592 | 4/1980 | Miyoshi et al. | 315/382 |
| 4,546,291 | 10/1985 | Morioka et al. | 315/382 |
| 4,549,216 | 10/1985 | Yuki | 358/242 |
| 5,331,532 | 7/1994 | Iwai et al. | 363/20 |
| 5,446,994 | 9/1995 | Akimoto et al. | 315/411 |

Primary Examiner—Robert Nappi
Assistant Examiner—Bao Q. Vu
Attorney, Agent, or Firm—Jacobson, Price, Holman & Stern, PLLC

[57] ABSTRACT

A focusing voltage adjusting circuit has a high voltage transformer, to produce and adjust a focusing voltage. The circuit includes a series circuit of a first and a second resistor, connected to a secondary coil of the transformer. Further included in the adjusting circuit is a voltage applying circuit which applies a low d.c. voltage to a terminal of the second resister. The terminal is opposite to another terminal of the second resistor connected to the first resistor. The adjusting circuit varies the d.c. voltage to adjust a focusing voltage appearing at the connection point of the first and second resistors.

18 Claims, 8 Drawing Sheets

FOCUSING VOLTAGE ADJUSTING CIRCUIT AND FLYBACK TRANSFORMER INSTALLING THE SAME

BACKGROUND OF THE INVENTION

This invention relates to a focusing voltage adjusting circuit and a flyback transformer used for a television having a cathode ray tube (CRT) and a display apparatus, etc.

Figure 1:
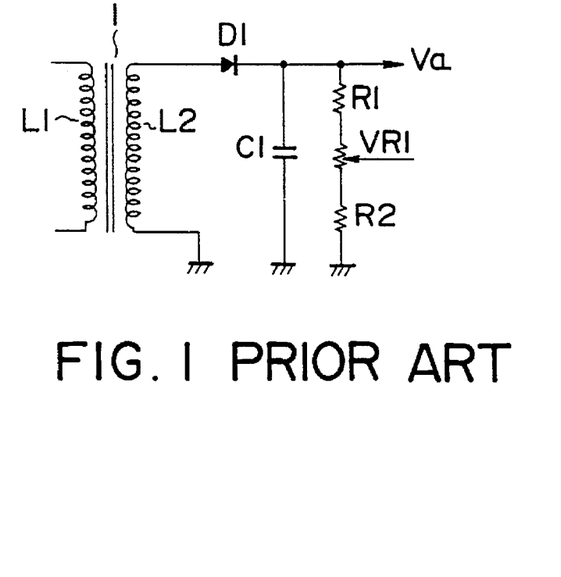
FIG. 1 shows a conventional focusing voltage adjusting circuit.

FIG. 1 shows a conventional focusing voltage adjusting circuit. In the figure, a high voltage transformer 1 has a primary coil L1 and a secondary coil L2 which is connected to a rectifier circuit consisting of a rectifier diode D1 and a smoothing capacitor C1, to produce a d.c. voltage Va.

Figure 2:
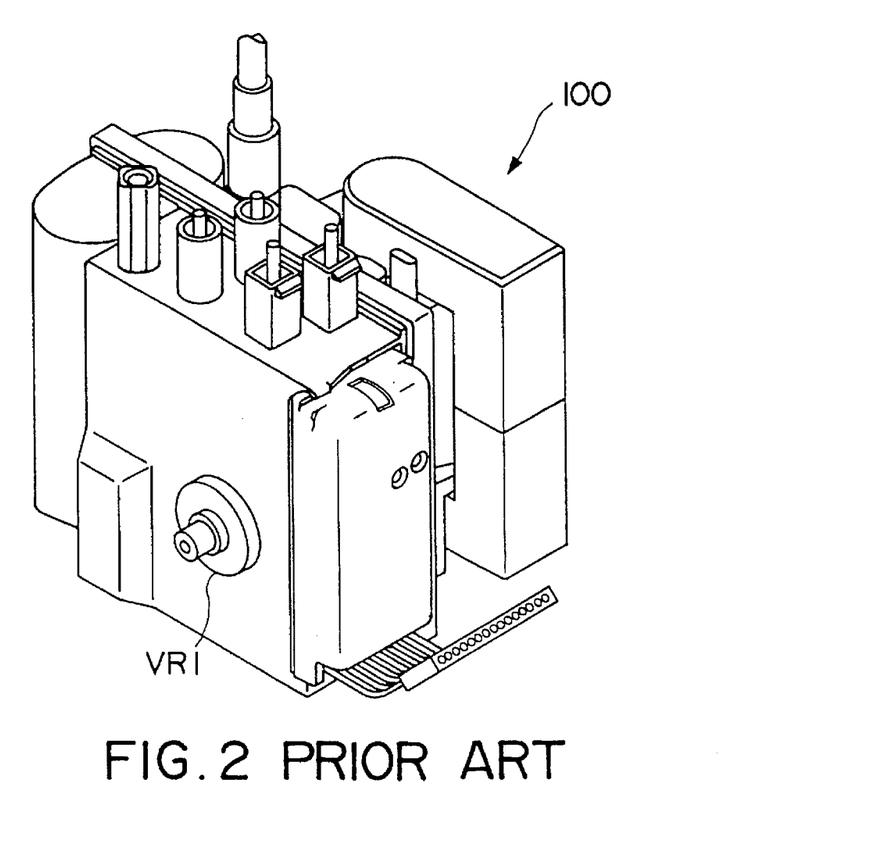
FIG. 2 is a perspective illustration of a conventional flyback transformer.

A series circuit of resistors R1 and R2 and a variable resistor VR1 is connected to a secondary terminal of the transformer 1 at which the d.c. voltage Va appears. The mechanical variable resistor VR1 is used for adjusting a focusing voltage. This conventional focusing voltage adjusting circuit is installed in a flyback transformer 100 shown in FIG. 2 and the focusing voltage is adjusted with the variable resistor VR1 fixed on a surface of the transformer 100.

Since the conventional voltage adjusting circuit adjusts a focusing voltage with the mechanical variable resistor VR1, this conventional circuit cannot facilitate automatic focusing voltage adjustment and lacks reliability.

Further, it is impossible to adjust a focusing voltage on the front face of an apparatus such as a television and display apparatus due to a position of the high voltage transformer 1 installed therein. And, difficulty lies in adjustment of the focusing voltage because the high voltage transformer 1 cannot be freely installed in such an apparatus.

SUMMARY OF THE INVENTION

A purpose of the invention is to provide a focusing voltage adjusting circuit that automatically adjusts a focusing voltage with high reliability and a flyback transformer installed to the focusing voltage adjusting circuit.

A focusing voltage adjusting circuit according to the present invention has a high voltage transformer, to produce and adjust a focusing voltage. The focusing voltage adjusting circuit comprises: a series circuit of a first and a second resistor, connected to a secondary coil of the transformer; and first voltage applying means for applying a d.c. voltage to a terminal of the second resistor, the terminal being opposite to another terminal thereof connected to the first resistor, thus varying the d.c. voltage to adjust a focusing voltage appearing at a connection point of the first and second resistors.

The first voltage applying means may comprise: a series circuit of a third resistor connected to the other terminal of the second resistor and a fourth resistor having a terminal which is grounded; a first transistor having a collector connected to a connection point of the second and third resistors and an emitter being grounded via a resistor; an operational amplifier having an output terminal connected to a base of the first transistor and a non-inverting input terminal connected to a connection point of the third and fourth resistors; and reference voltage generating means, connected to an inverting input terminal of the operational amplifier, for generating and varying a reference voltage, thus the focusing voltage adjusting circuit varying the d.c. voltage with the varied reference voltage.

The first voltage applying means may comprise: a series circuit of a third and a fourth resistor connected to the other terminal of the second resistor and a fifth resistor having a terminal which is grounded; a first transistor having a collector connected to a connection point of the second and third resistors and an emitter connected to a connection point of the third and fourth resistors via a resistor; second voltage applying means for applying a predetermined voltage to a base of the first transistor; a second transistor having a collector connected to the base of the first transistor via a resistor and further to the connection point of the third and fourth resistors and an emitter being grounded via a resistor; an operational amplifier having an output terminal connected to a base of the second transistor and a non-inverting input terminal connected to a connection point of the fourth and fifth resistors; and reference voltage generating means connected to an inverting input terminal of the operational amplifier, for generating and varying a reference voltage, thus the focusing voltage adjusting circuit varying the d.c. voltage with the varied reference voltage in accordance with a voltage applied to the base of the first transistor.

The first voltage applying means may comprise: a first transistor having a collector and an emitter connected across the first resistor; a transformer having a primary coil having a terminal which is grounded via a resistor and a secondary coil having a terminal which is connected to a base of the first transistor, another terminal of the secondary coil being connected to the emitter of the first transistor; a second transistor having an emitter connected to another terminal of the primary coil and a collector to which a predetermined voltage is applied; a diode having an anode connected to a base of the second transistor, a predetermined pulse voltage being applied to the anode; an operational amplifier having an output terminal connected to a cathode of the diode and an inverting input terminal connected to the other terminal of the second resistor and being grounded via a resistor; and reference voltage generating means, connected to a non-inverting input terminal of the operational amplifier, for generating and varying a reference voltage, thus the focusing voltage adjusting circuit varying the pulse voltage with the varied reference voltage to drive the first transistor to vary the d.c. voltage.

The first voltage applying means may comprise: a series circuit of a third resistor connected to the other terminal of the second resistor and a fourth resistor being grounded; a transistor circuit having a collector connected to a connection point of the second and third resistors and an emitter being grounded via a resistor; and an operational amplifier having an output terminal connected to a base of the transistor circuit, a non-inverting input terminal connected to a connection point of the third and fourth resistors and an inverting input terminal being applied a reference voltage varying in a parabolic shape, thus the focusing voltage adjusting circuit varying the d.c. voltage with the reference voltage varying in the parabolic shape.

Further, a flyback transformer according to the present invention has a focusing voltage adjusting circuit installed therein and having a high voltage transformer, to produce and adjust a focusing voltage- The focusing voltage adjusting circuit comprises: a series circuit of a first and a second resistor, connected to a secondary coil of the transformer; and first voltage applying means for applying a d.c. voltage to a terminal of the second resistor, the terminal being opposite to another terminal thereof connected to the first resistor, thus varying the d.c. voltage to adjust a focusing voltage appearing at a connection point of the first and second resistors.

The first voltage applying means of the flyback transformer may comprise: a series circuit of a third resistor connected to the other terminal of the second resistor and a fourth resistor having a terminal which is grounded; a first transistor having a collector connected to a connection point of the second and third resistors and an emitter being grounded via a resistor; an operational amplifier having an output terminal connected to a base of the first transistor and a non-inverting input terminal connected to a connection point of the third and fourth resistors; and reference voltage generating means, connected to an inverting input terminal of the operational amplifier, for generating and varying a reference voltage, thus the focusing voltage adjusting circuit varying the d.c. voltage with the varied reference voltage.

The first voltage applying means of the flyback transformer may comprise: a series circuit of a third and a fourth resistor connected to the other terminal of the second resistor and a fifth resistor having a terminal which is grounded; a first transistor having a collector connected to a connection point of the second and third resistors and an emitter connected to a connection point of the third and fourth resistors via a resistor; second voltage applying means for applying a predetermined voltage to a base of the first transistor; a second transistor having a collector connected to the base of the first transistor via a resistor and further to the connection point of the third and fourth resistors and an emitter being grounded via a resistor; an operational amplifier having an output terminal connected to a base of the second transistor and a non-inverting input terminal connected to a connection point of the fourth and fifth resistors; and reference voltage generating means connected to an inverting input terminal of the operational amplifier, for generating and varying a reference voltage, thus the focusing voltage adjusting circuit varying the d.c. voltage with the varied reference voltage in accordance with a voltage applied to the base of the first transistor.

The first voltage applying means of the flyback transformer may comprise: a first transistor having a collector and an emitter connected across the first resistor; a transformer having a primary coil having a terminal which is grounded via a resistor and a secondary coil having a terminal which is connected to a base of the first transistor, another terminal of the secondary coil being connected to the emitter of the first transistor; a second transistor having an emitter connected to another terminal of the primary coil and a collector to which a predetermined voltage is applied; a diode having an anode connected to a base of the second transistor, a predetermined pulse voltage being applied to the anode; an operational amplifier having an output terminal connected to a cathode of the diode and an inverting input terminal connected to the other terminal of the second resistor and being grounded via a resistor; and reference voltage generating means, connected to a non-inverting input terminal of the operational amplifier, for generating and varying a reference voltage, thus the focusing voltage adjusting circuit varying the pulse voltage with the varied reference voltage to drive the first transistor to vary the d.c. voltage.

The first voltage applying means of the flyback transformer may comprise: a series circuit of a third resistor connected to the other terminal of the second resistor and a fourth resistor being grounded; a transistor circuit having a collector connected to a connection point of the second and third resistors and an emitter being grounded via a resistor; and an operational amplifier having an output terminal connected to a base of the transistor circuit, a non-inverting input terminal connected to a connection point of the third and fourth resistors and an inverting input terminal being applied a reference voltage varying in a parabolic shape, thus the focusing voltage adjusting circuit varying the d.c. voltage with the reference voltage varying in the parabolic shape.

DETAILED DESCRIPTION OF THE PREFERRED EMBODIMENTS

The focusing voltage adjusting circuit of the present invention will be described in detail with reference to the drawings.

Figure 3:
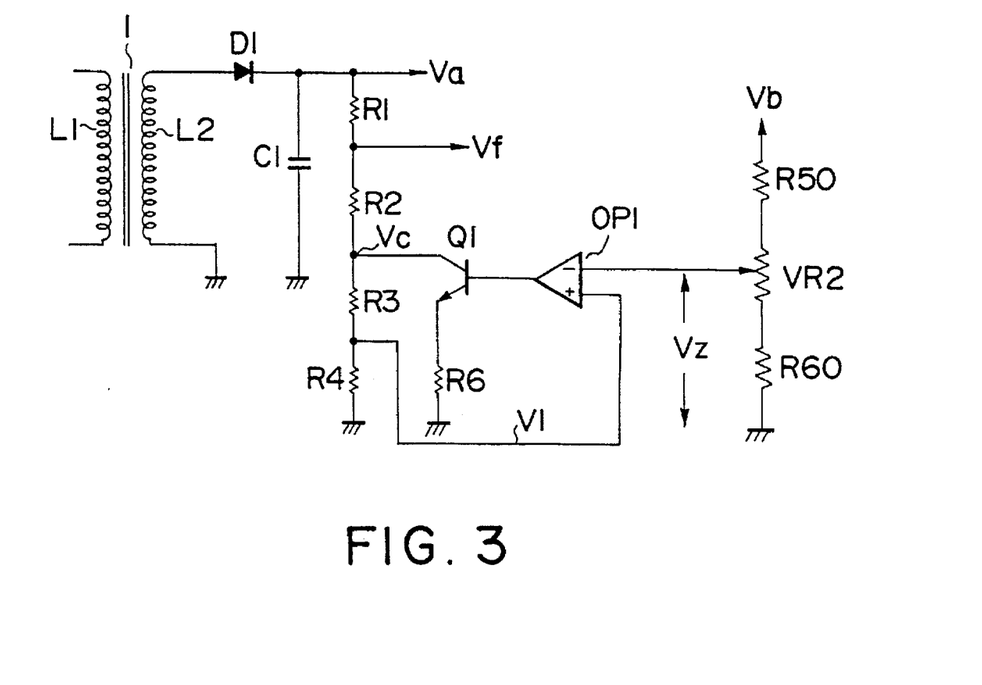
FIG. 3 is a circuit diagram of the first preferred embodiment of the focusing voltage adjusting circuit according to the present invention.

In FIG. 3 showing the first preferred embodiment, a high voltage transformer 1 has a primary coil L1 and a secondary coil L2 which is connected to a rectifier circuit having a rectifier diode D1 and a smoothing capacitor C1, to produce a d.c. voltage Va. A series circuit of resistors R1, R2, R3 and R4 is connected between a secondary terminal producing the d.c. voltage Va and the ground. The second and third resistors are connected, at their connection point, to the collector of an NPN transistor Q1. Third and fourth resistors are connected, at their connection point, to the non-inverting input terminal of an operational amplifier OP1.

The inverting input terminal of the operational amplifier OP1 is connected to the tap of a variable resistor VR2 which is connected to resistors R50 and R60. The resistor R50 is applied a low voltage Vb of about 12 V, while the resistor R60 is grounded. The variable resistor VR2 varies a reference voltage Vz applied to the inverting input terminal of the operational amplifier OP1. The output terminal of the operational amplifier OP1 is connected to the base of the transistor Q1 whose emitter is grounded via a resistor R6. A closed loop consists of the resistor R3, operational amplifier OP1 and transistor Q1. In this configuration, a voltage appearing at the connection point of the first and second resistors R1 and R2 is output as a focusing voltage Vf as described below.

Adjustment to the focusing voltage Vf by varying the reference voltage Vz will be discussed. When a voltage V1 appearing at the connection point of the resistors R3 and R4 is higher than the reference voltage Vz, a base voltage of the transistor Q1 rises and then a collector voltage Vc drops, thus the voltage V1 drops. On the other hand, when the voltage V1 is lower than the reference voltage Vz, the base voltage drops and then the collector voltage Vc rises, thus the voltage V1 rises. The voltage V1 thus becomes stable as equal to the reference voltage Vz.

That is, since Vc×R4/(R4+R3)=Vz, and $$Vf=Va\times R2/(R1+R2)+Vc\times R1/(R1+R2) \qquad (1)$$

$$Vf=Va\times R2/(R1+R2)+(R3+R4)\times R1\times Vz/\{(R1+R2)/R4\} \qquad (2)$$

Thus, the focus voltage Vf is adjusted by varying the reference voltage Vz.

The values of the resistors R1, R2, R3 and R4 are selected so that the collector voltage Vc appearing when the transistor Q1 is turned off does not exceed a voltage that the transistor Q1 withstands.

It is understood that when the value of R1/(R1+R2) is almost zero, the focusing voltage Vf is hardly varied. However, since a focusing voltage required for a cathode ray tube is about ±2% variation in a voltage which is 20 to 30% of the d.c. voltage Va, such a simple circuit as shown in FIG. 3 can be applied to the cathode ray tube.

Figure 4:
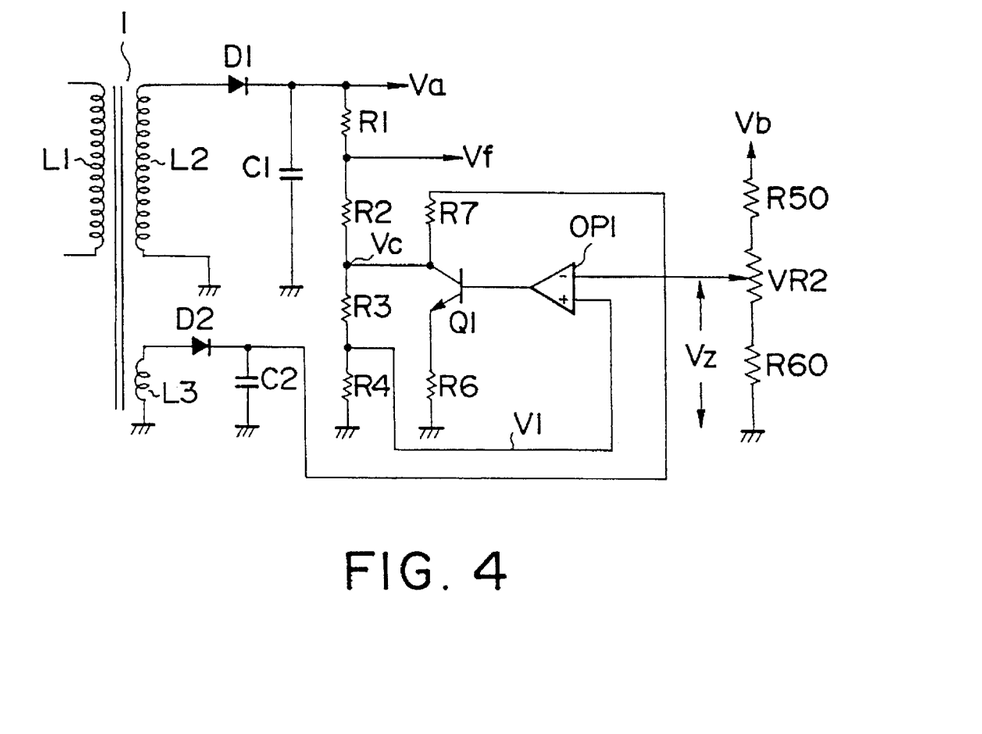
FIG. 4 is a circuit diagram of the second preferred embodiment of the focusing voltage adjusting circuit according to the present invention.

The second preferred embodiment will be described with reference to FIG. 4. The operational principle of the second embodiment is the same as that of the first embodiment of FIG. 3. The difference is that, in FIG. 4, the collector of a transistor Q1 is connected to a d.c. supply circuit having a secondary coil L3 of the high voltage transformer 1, a diode D2 and a capacitor C2. The d.c. supply circuit serves to maintain a collector voltage Vc of the transistor Q1 appearing when the transistor Q1 is turned off below a voltage that the transistor Q1 withstands.

The focusing voltage Vf can be adjusted by varying the reference voltage Vz expressed by the equation (2), the same as described in the first preferred embodiment.

Figure 5:
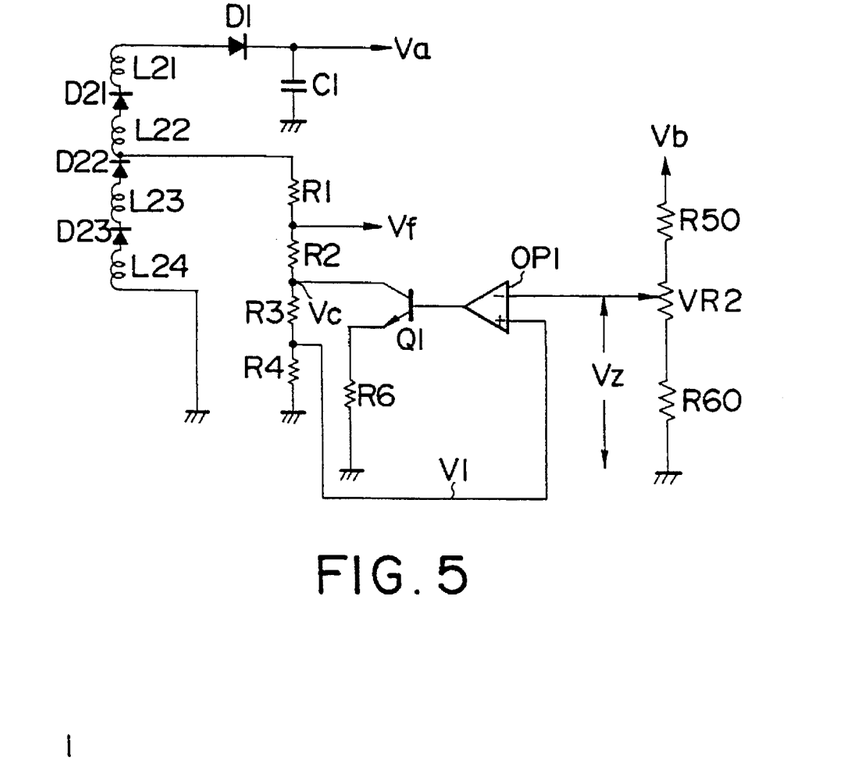
FIG. 5 is a partial circuit diagram of another circuit configuration of the first and second preferred embodiments.

FIG. 5 shows a partial circuit diagram of another example of the first and second preferred embodiments of the focusing voltage adjusting circuit. In this example, a voltage is taken out at the mid tap (the connection point of a coil L22 and a diode D22) of a secondary coil which consists of coils L21, L22, L23 and L24 and diodes D21, D22, D23 and D24 connected in series and corresponds to the secondary coil L2 of FIGS. 3 and 4. A series circuit of R1, R2, R3 and R4 is connected between the connection point of the coil L22 and diode D22 and the ground. A focusing voltage Vf is produced and adjusted at the connection point of the resistors R1 and R2, the same as described with reference to FIGS. 3 and 4.

A rectifier circuit consists of the series circuit of the coils D21 to D24 and the diodes D21 to D24 and a diode D1 and a capacitor C1. This rectifier circuit is advantageous in that it can withstand a higher voltage than the withstand voltage of the rectifier circuit of the coil L2 and diode D1 shown in FIGS. 3 and 4 even though a withstand voltage of each of rectifier circuits of the coil L24 and diode D23, the coil L23 and diode D22, the coil L22 and diode D21, and the coil L21 and diode D1 is not so high.

As described above, the first and second preferred embodiments can easily offer automatic focusing voltage adjustment with high reliability compared to the conventional circuit using a mechanical variable resistor. Further, since the conventional circuit has such a mechanical variable resistor (VR1 of FIG. 2) connected to the secondary terminal of the high voltage transformer and the high voltage appearing at the secondary terminal is directly varied by the mechanical variable resistor to adjust the focusing voltage, the mechanical variable resistor cannot be attached to any place except the flyback transformer.

On the contrary, in the present invention, since a low d.c. voltage applied to the resistor R2 is varied, the variable resistor (VR2 of FIGS. 3 and 4) may be of a type withstanding a low voltage and be attached to any place around the flyback transformer for easier adjustment. Further, the reference voltage Vz can be generated by a microcomputer without the variable resistor VR2. Reference and focusing voltage adjustments can be made by key entry from a ten-key pad to the microcomputer. The focusing voltage adjusting circuit thus may be made compact with lower cost.

Figure 6:
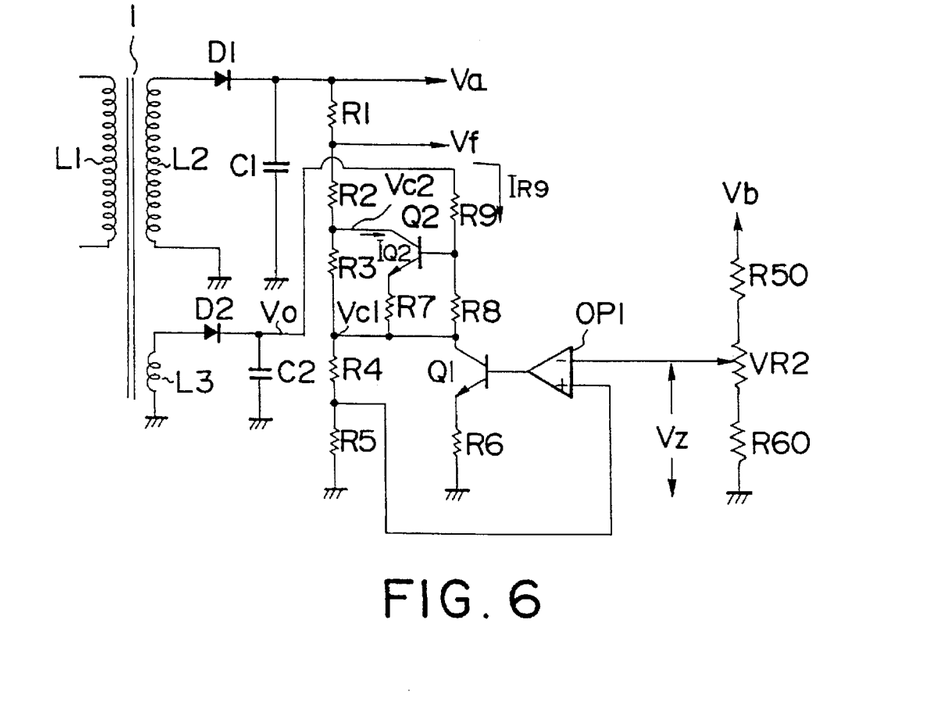
FIG. 6 is a circuit diagram of the third preferred embodiment of the focusing voltage adjusting circuit according to the present invention.

The third preferred embodiment will be described. In FIG. 6, a high voltage transformer 1 has a primary coil L1 and a secondary coil L2 which is connected to a rectifier circuit having a rectifier diode D1 and a smoothing capacitor C1, to produce a d.c. voltage Va. A series circuit of resistors R1, R2, R3, R4 and R5 is connected between a secondary terminal producing the d.c. voltage Va and the ground. The second and third resistors are connected, at their connection point, to the collector of an NPN transistor Q2. The third and fourth transistors are connected, at their connection point, to the collector of an NPN transistor Q1, to the emitter of the transistor Q2 via a resistor R7 and to the base of the transistor Q2 via a resistor R8. The base of the transistor Q2 is connected, via a resistor 9, to a d.c. supply circuit of a secondary coil L3 of the high voltage transformer 1, a diode D2 and a capacitor C2.

The emitter of the transistor Q1 is grounded via a resistor R6. The base of the transistor Q1 is connected to the output terminal of an operational amplifier OP1. The inverting input terminal of the amplifier is connected to a tap of a variable resistor VR2 which is connected to resistors R30 and R60. The resistor R50 is applied a low voltage Vb of about 12 V, while the resistor R60 is grounded. The variable resistor VR2 varies a reference voltage Vz applied to the inverting input terminal of the operational amplifier OP1.

A voltage obtained by dividing a collector voltage Vc1 of the transistor Q1 with the resistors R4 and R5 is applied to the non-inverting input terminal of the operational amplifier OP1 which compares the reference voltage Vz and the voltage Vc1 with each other. A closed loop consists of the resistor R4, operational amplifier OP1 and transistor Q1. In this configuration, a voltage appearing at the connection point of the resistors R1 and R2 is output as a focusing voltage Vf as described below.

Adjustment to the focusing voltage Vf by varying the reference voltage Vz will be discussed. The functions of the operational amplifier OP1 and transistor Q1 are the same as those shown in FIGS. 3 and 4. Since the closed loop works so that the reference voltage Vz and the voltage obtained by dividing the voltage Vc1 with the resistors R4 and R5 become equal to each other, $$Vc1 = Vz \times (R4+R5)/R5 \quad (3)$$

and, a current IR9 flowing into the resistor R9 is $$IR9 = (V0 - Vc1)/(R8+R9) \quad (4)$$

where, Vo is a voltage generated by the d.c. supply circuit of the coil L3, diode D2 and capacitor C2 and a current flowing into the base of the transistor Q2 is minute.

A collector current IQ2 of the transistor Q2 is $$IQ2 = IR9 \times R8/R7 \quad (5)$$

when a base-emitter voltage Vbe of the transistor Q2 is IQ2×R7+Vb2=IR9×R8(IQ2×R7>>Bbe).

Adjustment is made to the resistors R7 and R8 so that a collector voltage Vc2 of the transistor Q2 becomes zero when the voltage Vc1 of the transistor Q1 becomes zero. When the voltage Vc1 is zero, a current flowing into the resistors R1 and R2 is Va/(R1+R2). When this current becomes equal to the current IQ2, a current flowing into the resistor R3 becomes zero, thus the difference between the voltages Vc1 and Vc2 becoming zero.

Va/(R1+R2) becomes approximately equal to (V0−Vc1)×(R8/R7)/(R8+R9). When the collector voltage Vc1 takes the maximum value (=V0), the currents IR9 and IQ2 become zero. The value of the resistor R3 is adjusted so that the collector voltage Vc2 becomes approximately 2×V0 when the voltage Vc1 equals to V0.

By making the adjustments as above, the collector voltage Vc2 becomes approximately 2×Vc1, and the focusing voltage Vf becomes $$Vf = Va \times R2/(R1+R2) + Vc2 \times R1/(R1+R2) \quad (6)$$
$$= Va \times R2/(R1+R2) + 2Vz \times (R4+R5)/R5 \times \{R1/(R1+R2)\}$$

The focusing voltage Vf thus can be adjusted by varying the reference voltage Vz. In the third embodiment, since Vc2=2×Vc1, if the transistors Q1 and Q2 withstand a voltage of 2 kV, the collector voltage Vc1 of the transistor Q1 becomes 2 kV. The collector voltage Vc2 of the transistor Q2 thus becomes variable approximately to 4 kV.

Figure 7:
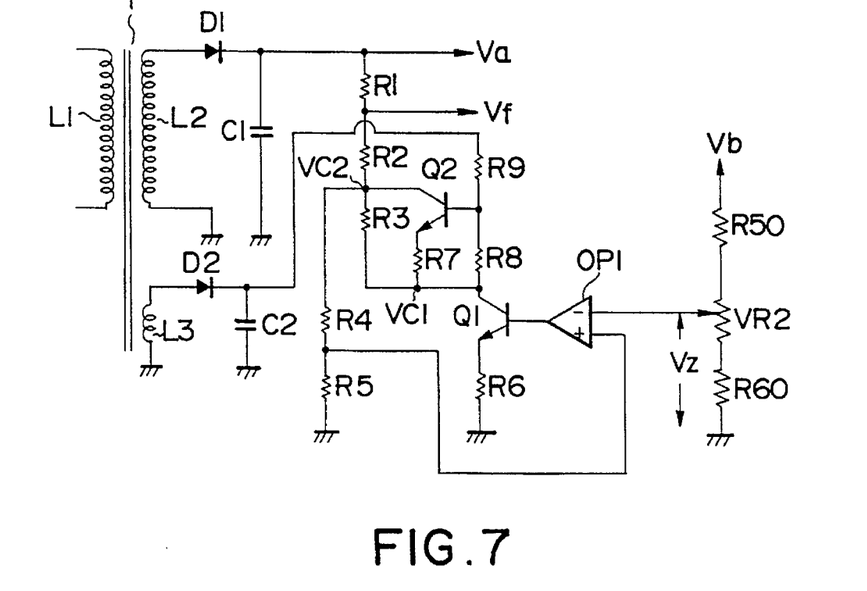
FIG. 7 is a circuit diagram of the fourth preferred embodiment of the focusing voltage adjusting circuit according to the present invention.

The fourth preferred embodiment shown in FIG. 7 has the same configuration as that of the third embodiment of FIG. 6 except that a resistor R4 is connected to the connection point of resistors R2 and R3. Thus, the equations (3) and (6) are modified for the fourth embodiment as follows:

$$Vc2 = Vz \times (R4+R5)/R5 \quad (3')$$

$$Vf = Va \times R2/(R1+R2) + Vc2 \times R1/(R1+R2) \quad (6')$$
$$= Va \times R2/(R1+R2) + Vz \times (R4+R5)/R5 \times \{R1/(R1+R2)\}$$

The focus voltage Vf thus can be adjusted by varying the reference voltage Vz.

Figure 8:
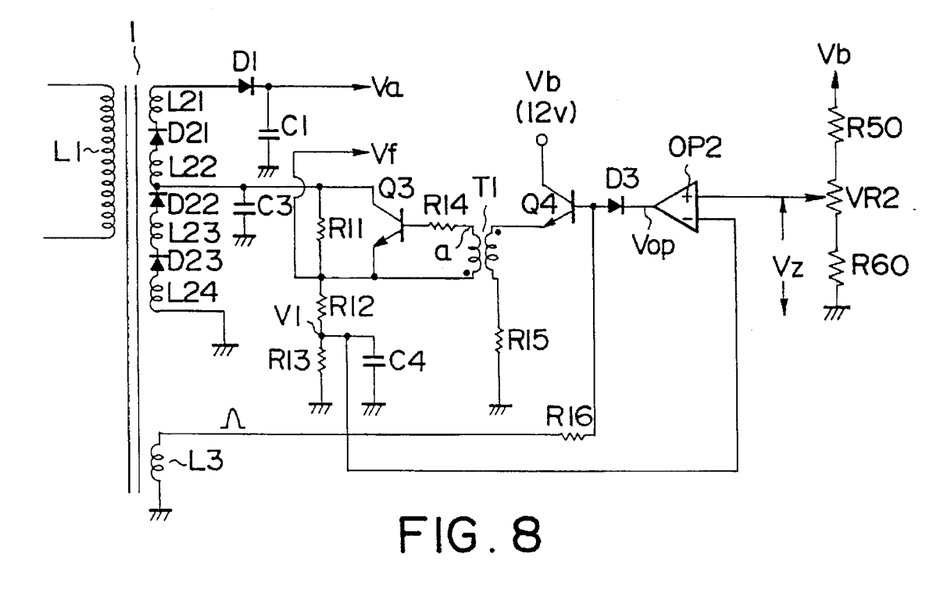
FIG. 8 is a circuit diagram of the fifth preferred embodiment of the focusing voltage adjusting circuit according to the present invention.

Next, the fifth preferred embodiment shown in FIG. 8 will be described. In FIG. 8, the collector of an NPN transistor Q3 is connected to the mid tap (the connection point of a coil L22 and a diode D22) of a high voltage transformer 1 which consists of coils L21, L22, L23 and L24 and diodes D21, D22, D23 and D24 connected in series. Further connected between the mid point and the ground are a series circuit of resistors R11, R12 and R13 and a capacitor C3. The emitter of a transistor Q3 is connected to the resistors R11 and R12 at their connection point and the base of the transistor Q3 is connected, via a resistor R14, to a secondary coil of a transformer T1 at its one end, the other end thereof being connected to the emitter of the transistor Q3.

A primary coil of the transformer T1 is connected between the emitter of a transistor Q4 and grounded via a resistor R15. The collector of the transistor Q4 is applied a low voltage Vb (12 V). The base of the transistor Q4 is connected to the anode of a diode D3. The cathode of the diode D3 is connected to the output terminal of an operational amplifier OP2 whose non-inverting input terminal is connected to the tap of a variable resistor VR2 which is connected to resistors R50 and R60. The resistor 50 is applied a low voltage of about 12 V, while the resistor R60 is grounded. The variable resistor VR2 varies a reference voltage Vz applied to the non-inverting input terminal of the operational amplifier OP2.

The operational amplifier OP2 is applied, at its inverting input terminal, a voltage V1 obtained by dividing the emitter voltage of the transistor Q3 with the resistors R12 and R13. The operational amplifier OP2 compares the reference voltage Vz and the voltage V1. The resistors R12 and R13 are connected, at their connection point, to a capacitor C4 which is grounded. A pulse generated at a coil L3 is applied to the base of a transistor Q4 via a resistor R16. In this configuration, the emitter voltage of the transistor Q3 is produced as a focusing voltage Vf as described below.

Figure 9A:
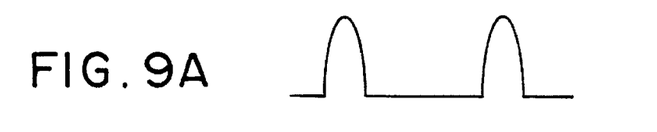
FIGS. 9A, 9B and 9C are waveforms explaining the function of the fifth preferred embodiment.
Figure 9B:
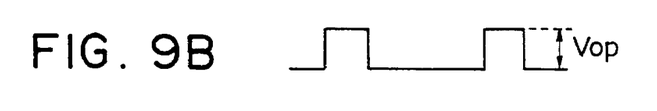
Figure 9C:
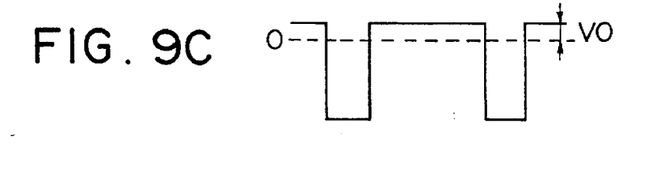

Adjustment to the focusing voltage Vf by varying the reference voltage Vz will be described. The function of the transformer T1 will be described first. The pulse generated at the coil L3 as shown in FIG. 9A is clipped through the diode D3 to be a pulse voltage Vop as shown in FIG. 9B which is the output of the operational amplifier OP2. The pulse Vop is applied, via the transistor Q4, to the primary coil of the transformer T1 to generate a voltage as shown in FIG. 9C at a point a of the secondary coil. The pulse of FIG. 9C is applied, via the resistor R14, to the base of the transistor Q3 which is then turned on.

As the output voltage Vop of the operational amplifier OP2 rises, the pulses at the primary and secondary coils of the transformer T1 rise. Since the pulse at the point a also rises, the voltage V0 shown in FIG. 9C rises to increase the collector current of the transistor Q3, thus the current flowing into the resistor R11 decreases. The emitter voltage of the transistor Q3 thus rises to raise the focusing voltage Vf.

Further, a closed loop including the operational amplifier OP2 will be described. When a voltage V1 appearing at the connection point of the resistors R12 and R13 is lower than the reference voltage Vz, the output voltage Vop of the operational amplifier OP2 rises to raise the voltage V0 shown FIG. 9C. The collector current of the transistor Q3 thus increases to decrease the current flowing into the resistor R11, thus raising the emitter voltage of the transistor Q3.

On the contrary, when the voltage V1 is higher than the reference voltage Vz, the emitter voltage of the transistor Q3 drops to make the closed loop stable such that the voltage V1 and the reference voltage Vz become equal to each other. Thus, $$Vf \times R13/(R12+R13) = Vz \quad Vf = \{(R12+R13)/R13\} \times Vz \quad (7)$$

The focusing voltage Vf is thus adjusted by varying the reference voltage Vz. This embodiment achieves wider range of adjustment to the focusing voltage Vf than the conventional circuit does. Further, since the voltage is taken out from the mid portion of the secondary coil, this embodiment achieves less power consumption and an easier design for insulation against high voltages than the conventional circuit.

Figure 10:
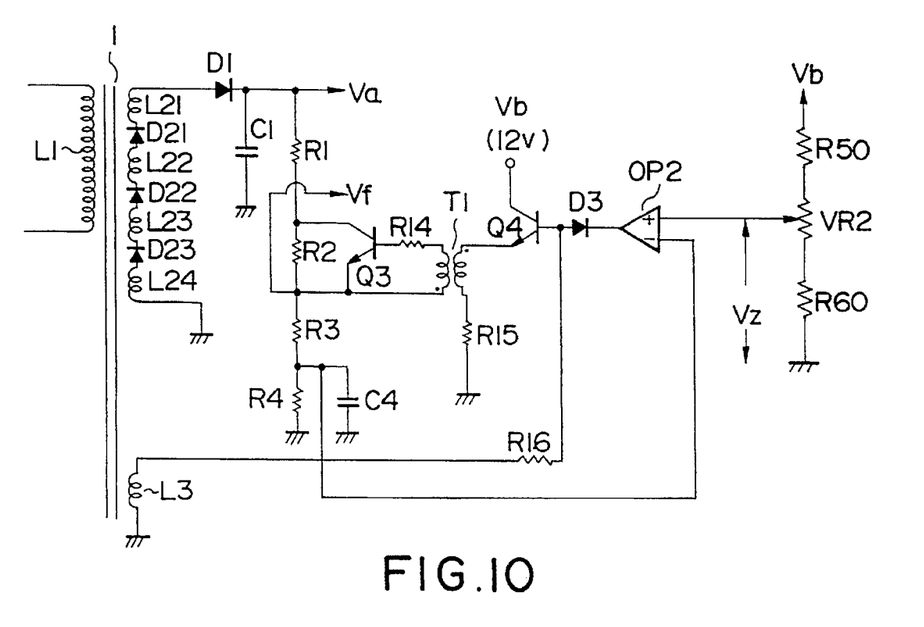
FIG. 10 is a circuit diagram of the sixth preferred embodiment of the focusing voltage adjusting circuit according to the present invention.

The sixth preferred embodiment shown in FIG. 10 includes a series circuit of resistors R1, R2, R3 and R4. The resistors R1 and R2 and the resistors R2 and R3 are connected to the collector and the emitter of the transistor Q3, respectively, at their connection points.

The equation (7) is, thus in this embodiment, $$Vf \times R4/(R3+R4)=Vz \quad Vf=\{(R3+R4)/R4\} \times Vz \tag{7'}$$

The third to sixth embodiments have features such that the focusing voltage can be automatically adjusted in a wide range by a low d.c. voltage with high reliability in addition to the features of the first and second embodiments.

Figure 11:
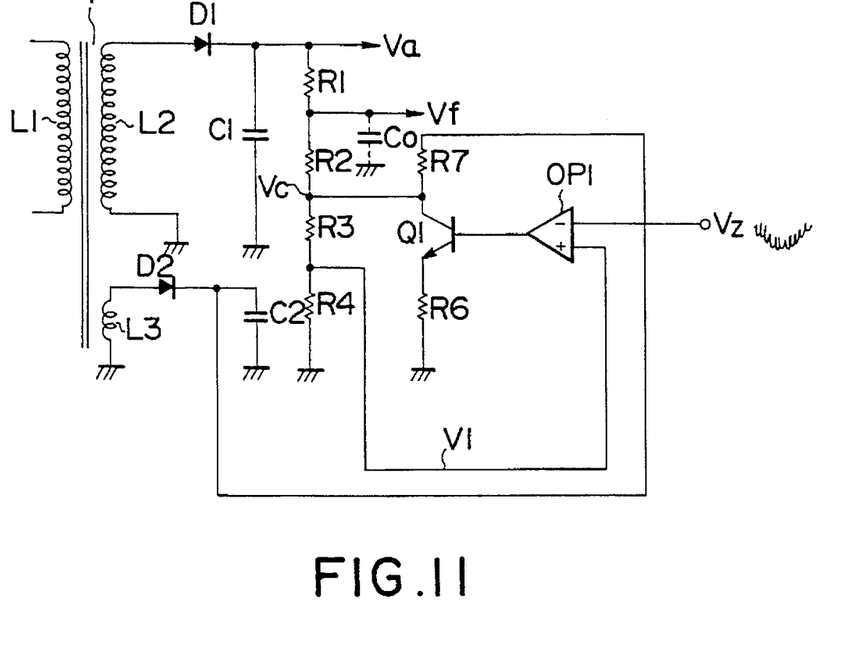
FIG. 11 is a circuit diagram of the seventh preferred embodiment of the focusing voltage adjusting circuit according to the present invention.

The seventh preferred embodiment shown in FIG. 11 has a dynamic focusing function in which a parabolic wave voltage which parabolically varies is applied as a reference voltage Vz to the inverting input terminal of an operational amplifier OP1 from a signal generator (not shown). The operation of the circuit of FIG. 11 is basically the same as that shown in FIG. 3.

Next, the eighth preferred embodiment shown in FIG. 12 will be described.

Figure 12:
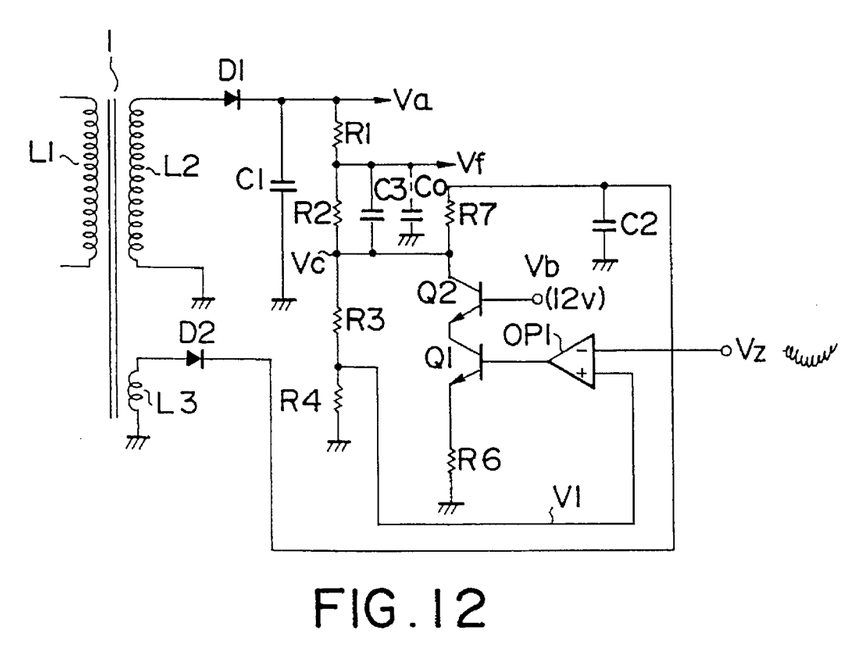
FIG. 12 is a circuit diagram of the eighth preferred embodiment of the focusing voltage adjusting circuit according to the present invention.

In FIG. 12, a high voltage transformer 1 has a primary coil L1 and a secondary coil L2 which is connected to a rectifier circuit having a rectifier diode D1 and a smoothing capacitor C1, to produce a d.c. voltage Va. A series circuit of resistors R1, R2, R3 and R4 is connected between the secondary terminal at which the d.c. voltage Va is generated and the ground. The voltage generated at the connection point of the resistors R1 and R2 is taken out as a focusing voltage Vf, the same as already described in the above embodiments. The resistors R2 and R3 are connected, at their connection point, to the collector of an NPN transistor Q2 whose emitter is connected to the collector of an NPN transistor Q1 to form a cascade connection. A d.c. voltage Vb (12 V) is applied to the base of the transistor Q2. A capacitor C3 is connected to the resistor R2 in parallel.

The resistors R3 and R4 are connected, at their connection point, to the non-inverting input terminal of an operational amplifier OP1 whose inverting input terminal is applied a parabolic wave reference voltage Vz from a signal generator (not shown). The output terminal of the operational amplifier OP1 is connected to the base of the transistor Q1 whose emitter is grounded via a resistor R6 and whose collector is connected to a d.c. supply circuit of a secondary coil L3, a diode D2 and a capacitor C2. A closed loop circuit consists of the resistor R3, operational amplifier OP1, transistors Q1 and Q2. The focusing voltage Vf can be adjusted by varying the reference voltage Vz, the same as already described in the above embodiments.

In the eighth embodiment shown in FIG. 12, the cascade connection of the transistors Q1 and Q2 offers better frequency characteristics than the seventh embodiment shown in FIG. 11. Further, the capacitor C3 serves to reproduce a parabolic wave focusing voltage Vf in the horizontal scanning period even though capacitance (C0 shown with a doted line) exists due to the connection of the resistor R2 or the resistors R1 and R2 at their connection point, etc., to a cathode ray tube (not shown). Thus, the application of the parabolic wave reference voltage Vz to this circuit serves to reproduce the parabolic wave focusing voltage Vf in the vertical and horizontal scanning periods.

The seventh and eighth embodiments offer the dynamic focusing function to the focusing voltage adjusting circuit.

Particularly, the eighth embodiment is capable of reproducing the parabolic wave focusing voltage Vf in the vertical and horizontal scanning periods.

The ninth preferred embodiment shown in FIG. 13 will be described.

Figure 13:
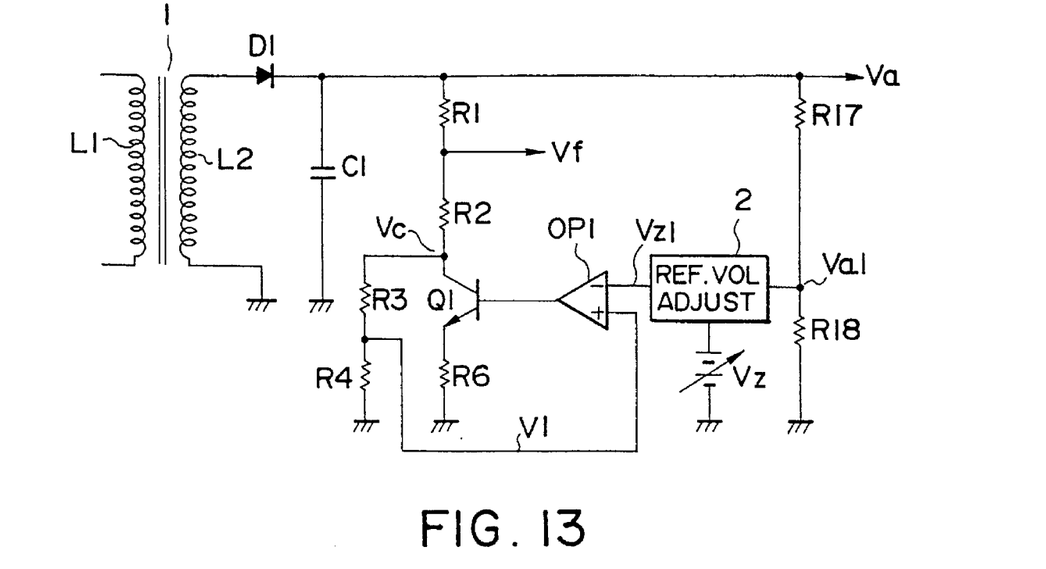
FIG. 13 is a circuit diagram of the ninth preferred embodiment of the focusing voltage adjusting circuit according to the present invention.

In FIG. 13, a high voltage transformer 1 has a primary coil L1 and a secondary coil L2 which is connected to a rectifier circuit having a rectifier diode D1 and a smoothing capacitor C1, to produce a d.c. voltage Va. A series circuit of resistors R1, R2, R3 and R4 is connected between the secondary terminal at which the d.c. voltage Va is generated and the ground. The voltage produced at the connection point of the resistors R1 and R2 is taken out as a focusing voltage Vf, the same as already described in the above embodiments. The resistors R2 and R3 are connected, at their connection point, to the collector of an NPN transistor Q1. The resistors R3 and R4 are connected, at their connection point, to the non-inverting input terminal of an operational amplifier OP1 whose inverting input terminal is applied an adjusted reference voltage Vz1 from a reference voltage adjusting circuit 2 as described below. The output terminal of the operational amplifier OP1 is connected to the base of the transistor Q1 whose emitter is grounded via a resistor R6. A closed loop consists of the resistor R3, operational amplifier OP1 and transistor Q1.

Varying the second term $(R5+R4) \times R1 \times Vz/\{(R1+R2)/R4\}$ in the equation (2) in accordance with a high d.c. voltage Va, that is, $Vz=K \times Va$ (K: a constant) produces a focusing voltage Vf in proportion to the high voltage. Thus, the focusing adjusting circuit of the ninth embodiment has a series circuit of resistors R17 and R18 between the secondary terminal and the ground. A voltage Va1 produced at the connection point of the resistors R17 and R18 is applied to a reference voltage adjusting circuit 2 which adjusts the reference voltage Vz in accordance with the voltage Va1 and applies the adjusted reference voltage Vz as a reference voltage Vz1 to the operational amplifier OP1.

Figure 14:
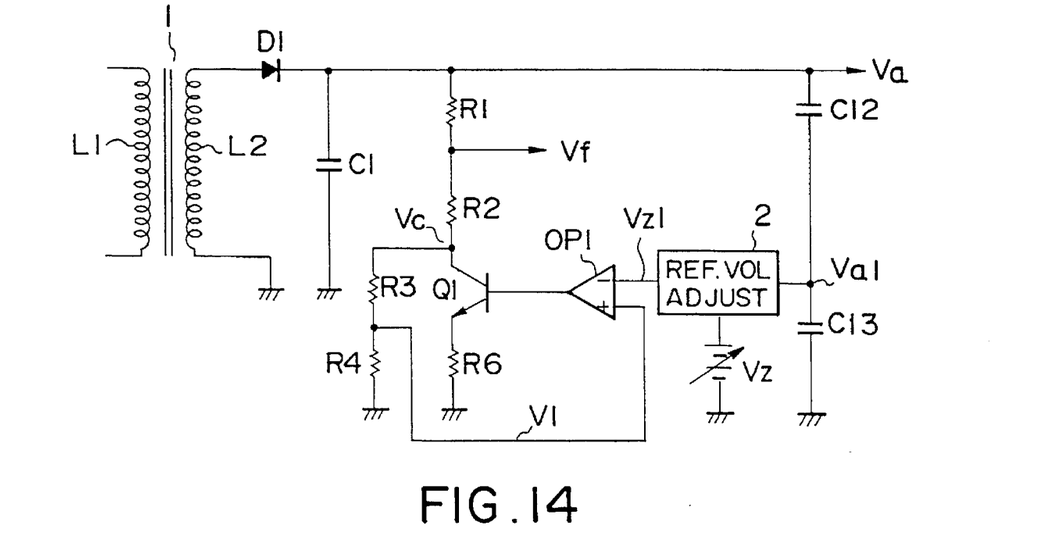
FIG. 14 is a circuit diagram of the tenth preferred embodiment of the focusing voltage adjusting circuit according to the present invention.

The tenth preferred embodiment has a series circuit of capacitors C12 and C13 as shown in FIG. 14. A voltage Va1$\{C12/(C12+C13)\}$ produced at the connection point of the capacitors C12 and C13 is applied to a reference voltage adjusting circuit 2. The operation of the circuit of FIG. 14 is basically the same as that of FIG. 1.

Figure 15:
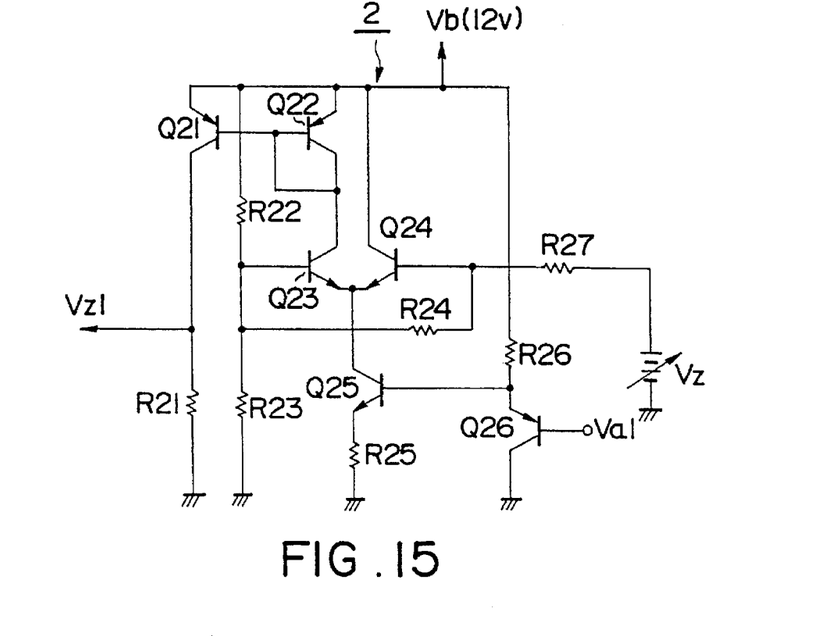
FIG. 15 is a circuit diagram of a reference voltage varying circuit 2 shown in FIGS. 13 and 14.

FIG. 15 shows an example of the reference voltage adjusting circuit 2 in FIGS. 13 and 14. This circuit is a well known gain control circuit including PNP transistors Q21, Q22 and Q26, NPN transistors Q23, Q24 and Q25 and resistors R21, R22, R23, R24, R25, R26 and R27. Applied to the base of the transistor Q26 is a voltage Va1 obtained by dividing the voltage Va with the resistors R17 and R18 of FIG. 13 or the capacitors C13 and C14 of FIG. 14. The current flowing into the transistor Q22 is in proportion to the voltage Va1. A current miller circuit consists of the transistors Q21 and Q22 in which a current $I_{Q21}$ flowing into the transistor Q21 is equal to a current flowing into the transistor Q22. The output voltage Vz1 thus becomes $R21 \times I_{Q21}$ and hence $Vz1=K \times Va1=K \times Va$ (K: a constant). The voltage Vz1 thus depends on the high voltage Va.

The ninth and tenth preferred embodiments have a feature such that a suitable focusing voltage Vf can be always produced which depends on a varying high voltage produced at the secondary terminal of the high voltage transformer 1 other than the features of the first and second embodiments.

Figure 16:
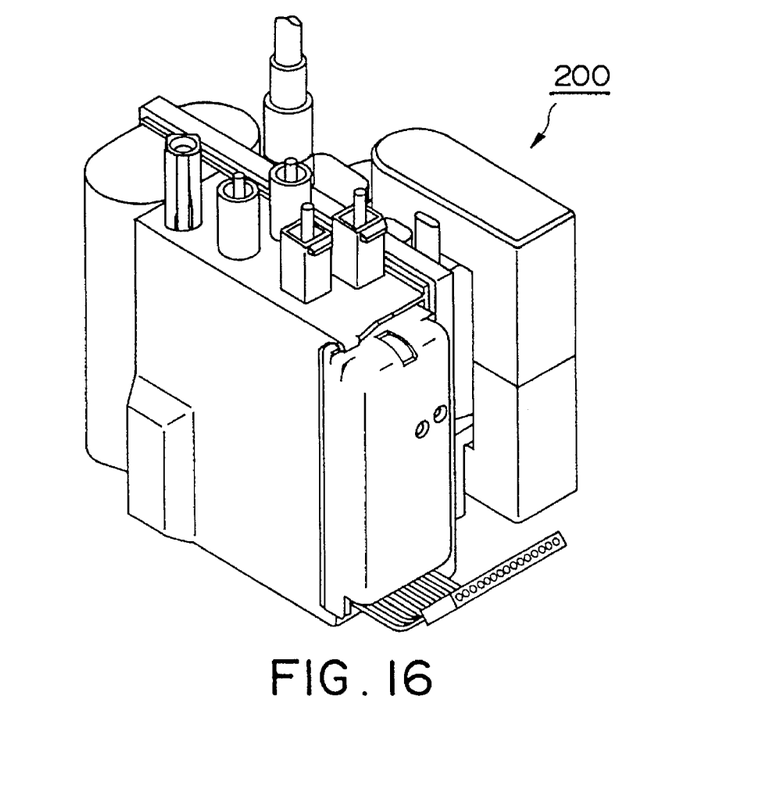
FIG. 16 is a perspective illustration of a preferred embodiment of a flyback transformer according to the present invention.

The focusing voltage adjusting circuit of the present invention is installed into a flyback transformer 200 as shown in FIG. 16. The flyback transformer 200 does not need a mechanical variable resistor for focusing voltage adjustment such as the variable resistor VR1 of the conventional flyback transformer 100 shown in FIG. 2.

As described above, the first and second preferred embodiments can easily offer automatic focusing voltage adjustment by adjusting the focusing voltage with a low d.c. voltage with high reliability compared to the conventional circuit using a mechanical variable resistor. Further, in the first and second preferred embodiments, since the low d.c. voltage applied to the resistor R2 of FIG. 3 or 4 is varied by the variable resistor VR2, not the high voltage appearing at the secondary terminal of the high voltage transformer by the variable resistor VR1 of FIG. 1, the variable resistor VR2 can be attached to any place around the flyback transformer for easier adjustment. Further, the focusing voltage adjusting circuit thus may be made compact with lower cost.

The third to sixth embodiments have features such that the focusing voltage can be adjusted in wide range compared to the conventional circuit in addition to offering automatic focusing voltage adjustment by a low d.c. voltage with high reliability.

The seventh and eighth embodiments offer the dynamic focusing function to the focusing voltage adjusting circuit in addition to the highly reliable automatic focusing voltage adjustment. Particularly, the eighth embodiment is capable of reproducing the parabolic wave focusing voltage in the vertical and horizontal scanning periods.

The ninth and tenth embodiments have a feature such that a suitable focusing voltage can be always produced which depends on a varying high voltage produced at the secondary terminal of the high voltage transformer in addition to the highly reliable automatic focusing voltage adjustment.

What is claimed is:

1. A focusing voltage adjusting circuit having a high voltage transformer, to produce and adjust a focusing voltage, comprising:

a rectifier circuit connected to a secondary coil of the high voltage transformer;

a series circuit of a first and a second resistor, electrically connected to the secondary coil of the high voltage transformer; and first voltage applying means for applying a d.c. voltage to a terminal of the second resistor, the terminal being opposite to another terminal thereof connected to the first resistor, thus varying the d.c. voltage to adjust a focusing voltage appearing at a connection point of the first and second resistors.

2. The circuit according to claim 1, wherein the first voltage applying means comprises:

a series circuit of a third resistor connected to the other terminal of the second resistor and a fourth resistor having a terminal which is grounded;

a first transistor having a collector connected to a connection point of the second and third resistors and an emitter being grounded via a resistor;

an operational amplifier having an output terminal connected to a base of the first transistor and a non-inverting input terminal connected to a connection point of the third and fourth resistors; and reference voltage generating means, connected to an inverting input terminal of the operational amplifier, for generating and varying a reference voltage, thus the focusing voltage adjusting circuit varying the d.c. voltage with the varied reference voltage.

3. The circuit according to claim 2, wherein the focusing voltage adjusting circuit further comprises second voltage applying means for applying a predetermined voltage to the collector of the first transistor so that a collector voltage being produced when the first transistor is turned off is maintained below a voltage that the first transistor withstands.

4. The circuit according to claim 1, wherein the secondary coil of the high voltage transformer includes a plurality of series circuits each having a coil and a diode, the series circuit of the first and second resistors being connected to a predetermined connection point of the plurality of the series circuits.

5. The circuit according to claim 1, wherein the first voltage applying means comprises:

a series circuit of a third and a fourth resistor connected to the other terminal of the second resistor and a fifth resistor having a terminal which is grounded;

a first transistor having a collector connected to a connection point of the second and third resistors and an emitter connected to a connection point of the third and fourth resistors via a resistor;

second voltage applying means for applying a predetermined voltage to a base of the first transistor;

a second transistor having a collector connected to the base of the first transistor via a resistor and further to the connection point of the third and fourth resistors and an emitter being grounded via a resistor;

an operational amplifier having an output terminal connected to a base of the second transistor and a non-inverting input terminal connected to a connection point of the fourth and fifth resistors; and reference voltage generating means connected to an inverting input terminal of the operational amplifier, for generating and varying a reference voltage, thus the focusing voltage adjusting circuit varying the d.c. voltage with the varied reference voltage in accordance with a voltage applied to the base of the first transistor.

6. The circuit according to claim 5, wherein the third and fourth resistors are connected in series, the collector of the second transistor being connected to a connection point of the third and fourth resistors.

7. The circuit according to claim 5, wherein the fourth resistor is connected, at a terminal thereof opposite to a terminal thereof connected to the fifth resistor, to the connection point of the second and third resistors.

8. The circuit according to claim 1, wherein the first voltage applying means comprises:

a first transistor having a collector and an emitter connected across the first transistor;

a transformer having a primary coil having a terminal which is grounded via a resistor and a secondary coil having a terminal which is connected to a base of the first transistor, another terminal of the secondary coil being connected to the emitter of the first transistor;

a second transistor having an emitter connected to another terminal of the primary coil and a collector to which a predetermined voltage is applied;

a diode having an anode connected to a base of the second transistor, a predetermined pulse voltage being applied to the anode;

an operational amplifier having an output terminal connected to a cathode of the diode and an inverting input terminal connected to the other terminal of the second resistor and being grounded via a resistor; and reference voltage generating means, connected to a non-inverting input terminal of the operational amplifier, for generating and varying a reference voltage, thus the focusing voltage adjusting circuit varying the pulse voltage with the varied reference voltage to drive the first transistor to vary the d.c. voltage.

9. The circuit according to claim 1, wherein the first voltage applying means comprises:
- a series circuit of a third resistor connected to the other terminal of the second resistor and a fourth resistor being grounded;
- a transistor circuit having a collector connected to a connection point of the second and third resistors and an emitter being grounded via a resistor; and
- an operational amplifier having an output terminal connected to a base of the transistor circuit, a noninverting input terminal connected to a connection point of the third and fourth resistors and an inverting input terminal being applied a reference voltage varying in a parabolic shape, thus the focusing voltage adjusting circuit varying the d.c. voltage with the reference voltage varying in the parabolic shape.

10. The circuit according to claim 9, wherein the transistor circuit includes a first and a second transistor connected in a cascade connection, the first transistor having a base being applied a predetermined voltage, a collector connected to a connection point of the second and third resistors and an emitter connected to a collector of the second transistor, the second transistor having a base connected to the output terminal of the operational amplifier and an emitter being grounded via a resistor.

11. The circuit according to claim 2, wherein the reference voltage generating means includes a voltage dividing circuit which divides a high voltage applied by the high voltage transformer, the reference voltage generating means varying the reference voltage in accordance with the voltage thus divided.

12. The circuit according to claim 11, wherein the voltage dividing circuit includes at least two resistors connected in series.

13. The circuit according to claim 11, wherein the voltage dividing circuit includes at least two capacitors connected in series.

14. A flyback transformer having a focusing voltage adjusting circuit which is installed therein and has a high voltage transformer, to produce and adjust a focusing voltage, the focusing voltage adjusting circuit comprising:
- a rectifier circuit connected to a secondary coil of the high voltage transformer;
- a series circuit of a first and a second resistor, electrically connected to the secondary coil of the high voltage transformer; and
- first voltage applying means for applying a d.c. voltage to a terminal of the second resistor, the terminal being opposite to another terminal thereof connected to the first resistor, thus varying the d.c. voltage to adjust a focusing voltage appearing at a connection point of the first and second resistors.

15. The flyback transformer according to claim 14, wherein the first voltage applying means comprises:
- a series circuit of a third resistor connected to the other terminal of the second resistor and a fourth resistor having a terminal which is grounded;
- a first transistor having a collector connected to a connection point of the second and third resistors and an emitter being grounded via a resistor;
- an operational amplifier having an output terminal connected to a base of the first transistor and a noninverting input terminal connected to a connection point of the third and fourth resistors; and
- reference voltage generating means, connected to an inverting input terminal of the operational amplifier, for generating and varying a reference voltage, thus the focusing voltage adjusting circuit varying the d.c. voltage with the varied reference voltage.

16. The flyback transformer according to claim 14, wherein the first voltage applying means comprises:
- a series circuit of a third and a fourth resistor connected to the other terminal of the second resistor and a fifth resistor having a terminal which is grounded;
- a first transistor having a collector connected to a connection point of the second and third resistors and an emitter connected to a connection point of the third and fourth resistors via a resistor;
- second voltage applying means for applying a predetermined voltage to a base of the first transistor;
- a second transistor having a collector connected to the base of the first transistor via a resistor and further to the connection point of the third and fourth resistors and an emitter being grounded via a resistor;
- an operational amplifier having an output terminal connected to a base of the second transistor and a noninverting input terminal connected to a connection point of the fourth and fifth resistors; and
- reference voltage generating means connected to an inverting input terminal of the operational amplifier, for generating and varying a reference voltage, thus the focusing voltage adjusting circuit varying the d.c. voltage with the varied reference voltage in accordance with a voltage applied to the base of the first transistor.

17. The flyback transformer according to claim 14, wherein the first voltage applying means comprises:
- a first transistor having a collector and an emitter connected across the first transistor;
- a transformer having a primary coil having a terminal which is grounded via a resistor and a secondary coil having a terminal which is connected to a base of the first transistor, another terminal of the secondary coil being connected to the emitter of the first transistor;
- a second transistor having an emitter connected to another terminal of the primary coil and a collector to which a predetermined voltage is applied;
- a diode having an anode connected to a base of the second transistor, a predetermined pulse voltage being applied to the anode;
- an operational amplifier having an output terminal connected to a cathode of the diode and an inverting input terminal connected to the other terminal of the second resistor and being grounded via a resistor; and
- reference voltage generating means, connected to a noninverting input terminal of the operational amplifier, for generating and varying a reference voltage, thus the focusing voltage adjusting circuit varying the pulse voltage with the varied reference voltage to drive the first transistor to vary the d.c. voltage.

18. The flyback transformer according to claim 14, wherein the first voltage applying means comprises:
- a series circuit of a third resistor connected to the other terminal of the second resistor and a fourth resistor being grounded;
- a transistor circuit having a collector connected to a connection point of the second and third resistors and an emitter being grounded via a resistor; and
- an operational amplifier having an output terminal connected to a base of the transistor circuit, a noninverting input terminal connected to a connection point of the third and fourth resistors and an inverting input terminal being applied a reference voltage varying in a parabolic shape, thus the focusing voltage adjusting circuit varying the d.c. voltage with the reference voltage varying in the parabolic shape.

* * * * *